(12) United States Patent
Matthews et al.

(10) Patent No.: US 8,876,965 B2
(45) Date of Patent: Nov. 4, 2014

(54) BLENDED OPACIFIER FOR COATINGS AND POLYMERIC MATRICES

(71) Applicant: J.M. Huber Corporation, Atlanta, GA (US)

(72) Inventors: Hilary Ellen Matthews, Baltimore, MD (US); Ronald Louis Romer, Jarrettsville, MD (US)

(73) Assignee: J.M. Huber Corporation, Atlanta, GA (US)

( * ) Notice: Subject to any disclaimer, the term of this patent is extended or adjusted under 35 U.S.C. 154(b) by 0 days.

(21) Appl. No.: 13/793,425

(22) Filed: Mar. 11, 2013

(65) Prior Publication Data

US 2013/0298802 A1 Nov. 14, 2013

Related U.S. Application Data (60) Provisional application No. 61/644,492, filed on May 9, 2012.

(51) Int. Cl.
*C09C 1/28* (2006.01)
*C09C 1/36* (2006.01)
*C08K 3/00* (2006.01)

(52) U.S. Cl.
CPC ........... *C08K 3/0033* (2013.01); *C01P 2002/01* (2013.01); *C01P 2004/61* (2013.01); *C01P 2004/62* (2013.01); *C01P 2004/04* (2013.01); *C01P 2006/22* (2013.01); *C09C 1/28* (2013.01); *C01P 2006/19* (2013.01); *C01P 2004/64* (2013.01)
USPC ........... 106/446; 106/416; 106/417; 106/436; 106/437; 106/442; 106/444

(58) Field of Classification Search
CPC ..... C08K 3/0033; C09C 1/28; C01P 2002/01; C01P 2004/04; C01P 2004/61; C01P 2004/62; C01P 2004/64; C01P 2006/19; C01P 2006/22
USPC .......... 106/416, 417, 436, 437, 442, 444, 446
See application file for complete search history.

(56) References Cited

U.S. PATENT DOCUMENTS

| | | | | |
|---|---|---|---|---|
| 3,087,828 A | * | 4/1963 | Linton | 106/417 |
| 3,378,386 A | * | 4/1968 | Ledyy | 106/437 |
| 3,450,550 A | * | 6/1969 | Linton | 106/446 |
| 3,726,700 A | * | 4/1973 | Wildt | 106/437 |
| 4,537,636 A | * | 8/1985 | Bernhard et al. | 106/417 |
| 5,030,445 A | * | 7/1991 | Hashimoto et al. | 424/59 |
| 5,078,793 A | * | 1/1992 | Caton | 106/417 |
| 5,139,760 A | | 8/1992 | Ogawa et al. | |
| 5,152,835 A | * | 10/1992 | Nemeh | 106/437 |
| 5,248,556 A | | 9/1993 | Matijevic et al. | |
| 5,456,749 A | * | 10/1995 | Iwasa et al. | 106/417 |
| 5,888,291 A | | 3/1999 | Chopin et al. | |
| 6,899,757 B2 | * | 5/2005 | Chang et al. | 106/415 |
| 2004/0033204 A1 | * | 2/2004 | Ahn et al. | 424/49 |
| 2011/0136721 A1 | * | 6/2011 | Erbezci et al. | 510/513 |
| 2012/0003487 A1 | | 1/2012 | Richert et al. | |
| 2012/0027862 A1 | | 2/2012 | Schmidt et al. | |

FOREIGN PATENT DOCUMENTS

| | | | | |
|---|---|---|---|---|
| JP | 55-84975 A | * | 6/1980 | |
| WO | WO 00/01771 A1 | * | 1/2000 | C09C 1/36 |

OTHER PUBLICATIONS

Derwent-Acc-No: 2009-B33870, abstract of Chinese Patent Specification No. CN 101302359 A (Nov. 2008).*
International Search Report with Written Opinion issued on Aug. 22, 2013 for PCT/US2013/039085, filed May 1, 2013.

* cited by examiner

*Primary Examiner* — Anthony J Green
(74) *Attorney, Agent, or Firm* — Merchant & Gould (57) ABSTRACT

A composite comprising a silicate material, such as, a sodium aluminosilicate, and titanium dioxide disposed on the surface thereof is disclosed, together with formulations comprising the composite and methods for preparing the same.

17 Claims, 6 Drawing Sheets

BLENDED OPACIFIER FOR COATINGS AND POLYMERIC MATRICES

CROSS-REFERENCE TO RELATED APPLICATIONS

This application claims the benefit of priority to U.S. Provisional Patent Application No. 61/644,492, filed on May 9, 2012, which is hereby incorporated by reference in its entirety.

BACKGROUND

1. Technical Field

The present disclosure relates to coatings and opacifying agents for use therein.

2. Technical Background

Conventional paint and coating formulations are prepared by sequentially incorporating dry components into a liquid system. For example, a conventional paint can be prepared by sequentially adding dry ingredients, such as pigments and fillers, to a liquid under agitation. Each dry ingredient is typically wetted and incorporated into the resulting formulation prior to introduction of the next ingredient. In such conventional paint and coating formulations, some ingredients can be difficult to handle and/or disperse.

Thus, there is a need to address the aforementioned problems and other shortcomings associated with traditional paint and coating formulations, and opacifying agents used thereon. These needs and other needs are satisfied by the compositions and methods of the present disclosure.

SUMMARY

In accordance with the purpose(s) of the invention, as embodied and broadly described herein, this disclosure, in one aspect, relates to coatings and opacifying agents for use therein.

In one aspect, the present disclosure provides a dry blend composite comprising an aluminosilicate material and a plurality of titanium dioxide particles dispersed on the surface thereof.

In a second aspect, the present disclosure provides a slurry concentrate comprising an aluminosilicate and titanium dioxide composite, wherein titanium dioxide particles are dispersed on the surface of the aluminosilicate material.

In a third aspect, the present disclosure provides a coating formulation comprising an aluminosilicate and titanium dioxide composite, wherein titanium dioxide particles are dispersed on the surface of the aluminosilicate material.

In a fourth aspect, the present disclosure provides a method for preparing a dry blend composite comprising an aluminosilicate material and a plurality of titanium dioxide particles.

BRIEF DESCRIPTION OF THE FIGURES

The accompanying figures, which are incorporated in and constitute a part of this specification, illustrate several aspects and together with the description serve to explain the principles of the invention.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

DEFINITIONS

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a filler" or "a solvent" includes mixtures of two or more fillers, or solvents, respectively.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly described above, the present disclosure provides a dry blend of a silicate material and a titanium dioxide material that can be used, for example, in paints and/or coating formulations. In other aspects, the present disclosure provides concentrates and/or slurries, along with paints, coatings, and other materials comprising the dry blend of silicate and titanium dioxide. In still other aspects, the present disclosure provides methods for preparing and using such dry blends of silicate and titanium dioxide.

To prepare conventional paint and/or coating formulations, a liquid vehicle is typically placed in a vessel and agitated while individual ingredients are sequentially added. After addition of each ingredient, the mixture is agitated to wet the added ingredient and incorporate it into the formulation prior to introduction of the next ingredient. Such ingredients can include pigments, extenders, fillers, and other materials.

Titanium dioxide is frequently used as a pigment and/or opacifying agent in paints, coatings, plastics, and other items. In conventional paint and coating formulations, only a portion of the titanium dioxide present in the system is typically effective due to crowding effects that can reduce efficiency. In most formulations comprising titanium dioxide, an extender, such as a silicate material, is added to improve the performance of the resulting composition. These silicate materials can be difficult to handle and disperse into, for example, a coating formulation. The low density and high surface area of these materials can result in significant dusting, resulting in increased processing time and increased environmental and health risks.

In addition, the amount of liquid necessary to wet and disperse such silicate materials can be significant. For non-aqueous systems, a large amount of volatile organic compound (VOC) solvents can be needed. The use and presence of these solvents can present regulatory, health, flammability, and cost concerns. For waterborne systems, a significant amount of water can be required. In addition, some systems require water to flush tanks and lines during various stages of the manufacturing process. Thus, manufacturers of paints and coating systems are concerned with liquid requirements when selecting ingredients for their formulations.

In one aspect, the present disclosure provides an inorganic/inorganic composite that can be useful in paint and coating formulations. In another aspect, the present disclosure provides a composite of a silicate material and titanium dioxide. In another aspect, the composite comprises a silicate material and a plurality of titanium dioxide particles dispersed on the surface of the silicate material. In another aspect, at least a portion of the titanium dioxide particles are disposed in voids, cavities, and/or depressions in the silicate material surface.

The silicate material of the present invention can comprise any silicate or mixture of silicates suitable for use in forming a composite as described herein. In one aspect, the silicate material comprises an aluminosilicate. In another aspect, the silicate material can comprise an amorphous sodium aluminosilicate. In a further aspect, the silicate material comprises a sodium aluminosilicate, such as, for example, ZEOLEX® 330 sodium aluminosilicate, available from J.M. Huber Corporation, Atlanta, Ga., USA.

In various aspects, the silicate material can have an average particle size of from about 2 micrometers to about 50 micrometers, for example, about 2, 3, 5, 7, 9, 11, 13, 15, 17, 19, 21, 23, 25, 27, 29, 31, 33, 35, 37, 39, 41, 43, 45, 47, 49, or 50 micrometers; from about 3 micrometers to about 12 micrometers, for example, about 3, 4, 5, 6, 7, 8, 9, 10, 11, or 12 micrometers; or from about 5 micrometers to about 9 micrometers, for example, about 5, 6, 7, 8, or 9 micrometers. In a specific aspect, the silicate material or a portion thereof can have an average particle size of about 7 micrometers. In other aspects, the silicate material or a portion thereof can have an average particle size of less than about 2 micrometers or greater than about 50 micrometers, and the present invention is not intended to be limited to any particular particle size silicate material.

In one aspect, the silicate material of the present invention can have an oil absorption number of at least about 100 cc/100 g, for example, about 100, 110, 115, 120, 125, 130, 135, or 140 cc/100 g. In other aspects, the silicate material can exhibit an oil absorption number less than about 100 cc/100 g or greater than about 140 cc/100 g. In a specific aspect, the silicate material can have an oil absorption number of about 130 cc/100 g.

The titanium dioxide of the present invention can be any titanium dioxide material suitable for use in forming the composite as described herein. In one aspect, the titanium dioxide or a portion thereof is a rutile titanium dioxide. In another aspect, the titanium dioxide is a chloride-process rutile titanium dioxide, such as, for example, TIONA® 595, available from Cristal Global, Hunt Valley, Md., USA.

In one aspect, the titanium dioxide material comprises at least about 90 wt. % titanium dioxide, for example, about 90, 92, 94, 95, 96, 97, 98, 99% or more titanium dioxide. In another aspect, the titanium dioxide can exhibit a surface treatment comprising alumina, zirconia, one or more organic compounds, or a combination thereof. In another aspect, the titanium dioxide does not exhibit a surface treatment.

In another aspect, the titanium dioxide material can exhibit an oil absorption number of from about 15 cc/100 g to about 25 cc/100 g, for example, about 15, 17, 19, 21, 23, or 25 cc/100 g; or from about 19 cc/100 g to about 21 cc/100 g. In other aspects, the titanium dioxide material can exhibit an oil absorption number of less than 15 cc/100 g or greater than about 25 cc/100 g, and the present disclosure is not intended to be limited to any particular titanium dioxide oil absorption number.

In still other aspects, the titanium dioxide can have a particle size such that all or a portion of the titanium dioxide can be disposed in voids, cavities, and/or depressions in the surface of the silicate material. In one aspect, the titanium dioxide can occlude at least a portion of the porosity of the silicate material by at least partially filling the pores in the surface thereof. In one aspect, the titanium dioxide has an average particle size of less than about 1 micrometer, such as, for example, about 0.2, 0.25, 0.3, 0.35, 0.4, 0.45, 0.5, 0.55, 0.6, 0.65, 0.7, 0.75, 0.8, 0.85, 0.9, or 0.95 micrometers. In another aspect, the titanium dioxide has an average particle size of less than about 0.5 micrometers, for example, about 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, or 0.49 micrometers.

The inventive composite can be prepared by dry blending the silicate material, such as, for example, sodium aluminosilicate, and the titanium dioxide, such as, for example, a chloride-process rutile titanium dioxide, to form the composite. In one aspect, the materials can be blended while dry or substantially dry via a spatula or other mechanical means. In one aspect, the composite can be formed without the addition of shear forces from an automated mixer. In another aspect, a mechanical mixing means can be utilized to blend large quantities of the silicate material and the titanim dioxide in an efficient manner. The prepared dry blended composite can be introduced into a liquid system, for example, waterborne paint formulation, as a composite instead of as individual ingredients.

The amount of silicate material and titanium dioxide mixed to form a composite can vary, depending on, for example, the specific surface area, porosity, and particle size of the materials. One of skill in the art, in possession of this disclosure, could readily determine an appropriate amount of silicate material and titanium dioxide to form the inventive composite. In various aspects, the ratio (wt. %) of titanium dioxide to silicate material can be from about 2:1 to about 10:1, for example, 2:1, 3:1, 4:1, 5:1, 6:1, 7:1, 8:1, 9:1, or 10:1; or from about 3:1 to about 5:1, for example, about 3:1, 4:1, or 5:1. In other aspects, the ratio of titanium dioxide to silicate material can be less than about 2:1 or greater than about 10:1, and the present invention is not intended to be limited to any particular ratio of such components. In yet another aspect, a dry blend of silicate/titanium dioxide composite can also comprise an amount of unblended silicate. In various aspects, the dry blend can comprise a composite comprising silicate material and titanium dioxide disposed on the surface thereof, together with additional silicate material of the same or varying type at concentrations ranging from 0 to about 33 wt. %, for example, about 0, 10, 15, 20, 25, 30, or 35% of the total blended composition).

In one aspect, the inventive composite does not comprise a core/shell particle morphology or an encapsulating morphology, wherein a continuous coating surrounds each particle of silicate material.

In another aspect, a slurry can be prepared using the dry blended composite comprising silicate material and titanium dioxide disposed on the surface thereof. In one aspect, the slurry can be concentrated, saturated, or nearly saturated with the composite material described herein. In another aspect, the liquid vehicle of such a slurry can be aqueous and/or non-aqueous. In yet another aspect, such a slurry can comprise at least about 70 wt. % solids, for example, 70, 75, 80, 85, 90 wt. % or more solids. In still other aspects, such a slurry can have a viscosity of less than about 1000 cps, or less than about 500 cps. In one aspect, the composition and/or a slurry used in the preparation of the composite can comprise a surfactant and/or a phosphate compound. In another raspect, the composition does not comprise a phosphate compound. In yet another aspect, the composition does not comprise a surfactant. In still other aspects, if a phosphate compound and/or surfactant is utilized, any remaining phosphate compound and/or surfactant can be removed, for example, by washing, after formation of the composite.

In one aspect, all or most of the inventive composite can remain a composite when formed into a slurry. In another aspect, no appreciable amount of titanium dioxide is present in a form unattached to a silicate particle. In another aspect, such a composite can remain substantially unaffected after formulation into a paint or coating system, and/or application as a film or coating to a substrate. For example, a paint comprising the inventive composite can be formed and applied to a surface, wherein the film of dried paint can later be removed and subjected to analysis. In such a case, the composite can remain substantially intact.

The present invention offers several benefits over conventional paint and coating systems and methods for the preparation thereof. In one aspect, the cost of titanium dioxide can be subject to market fluctuations and global supply isses. In such an aspect, the use of the inventive composite described herein can reduce the amount of titanium dioxide necessary to obtain desirable properties in the final product. Similarly, use of the inventive composite can reduce the amount of water or organic solvent needed to wet and/or incorporate the composite, as compared to conventional systems wherein a silicate and titanium dioxide are added separately. The inventive composite wets and can be incorporated more readily into a paint and/or coating system than each of the individual components on their own.

In one aspect, the inventive composite can provide improved bulk density, handling, and reduced dusting over conventional preparation techniques.

In another aspect, paint and/or coating compositions comprising the inventive composite can exhibit improved opacity, improved stain resistance, and/or reduced liquid requirements as compared to conventionally prepared compositions.

In one aspect, a paint or coating formulation prepared using the inventive composite can have a stain resistance (color difference) of less than about 3, less than about 2.9, less than about 2.8, or less than about 2.5. Under similar conditions, a conventionally prepared paint can exhibit a stain resistance of about 3.25, 3.6, or higher. See FIG. 4 for details. In other aspects, the stain resistance or contrast ratio of a given formulation can vary based on the specific materials and concentrations thereof in a composition. In another aspect, the thickness of a film prepared using the inventive compositions can vary and can affect the desired film, color, and contrast properties. For example, films can be prepared having a thickness of from about 0.1 mils to a thickness of greater than about 60 mils, and the present invention is not intended to be limited to any particular film thickness. In other aspects, films having a thickness less than about 0.1 mils or greater than about 60 mils can be prepared.

In another aspect, a paint or coating formulation prepared using the inventive composite can exhibit a contrast ratio at a dry film thickness (DFT) of 1.5 mils of greater than about 70, greater than about 72, greater than about 74, greater than about 76, or more. In one aspect, a paint or coating formulation prepared using the inventive composite can exhibit a contrast ratio of about 77. See FIG. 5 for details.

In yet another aspect, a paint or coating formulation prepared using the inventive composite can exhibit a water requirement for dispersion (lbs of water in a 100 gallon formula necessary to obtain proper grind consistency) of less than about 250 lbs, less than about 225 lbs, less than about 220 lbs, less than about 210 lbs, or less than about 200 lbs. See FIG. 6 for details. In another aspect, the loading of the inventive composite in a coating formulation, such as, for example, a paint, can vary from less than about 50 lbs per 100 gal to over 280 lbs per 100 gal in titanium dioxide containing paints. In one aspect, and while not wishing to be bound by theory, higher loadings can create a higher degree of crowding, wherein the benefits of the inventive composite can be realized.

Figure 1:
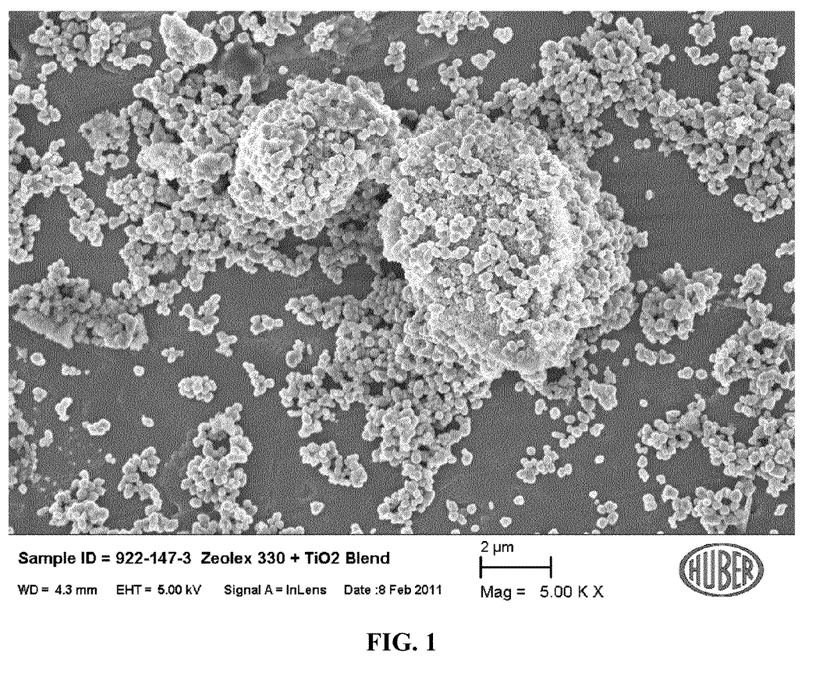
FIG. 1 is a scanning electron micrograph of a blend of Zeolex® 330 sodium aluminosilicate and titanium dioxide, in accordance with various aspects of the present disclosure.
Figure 2:
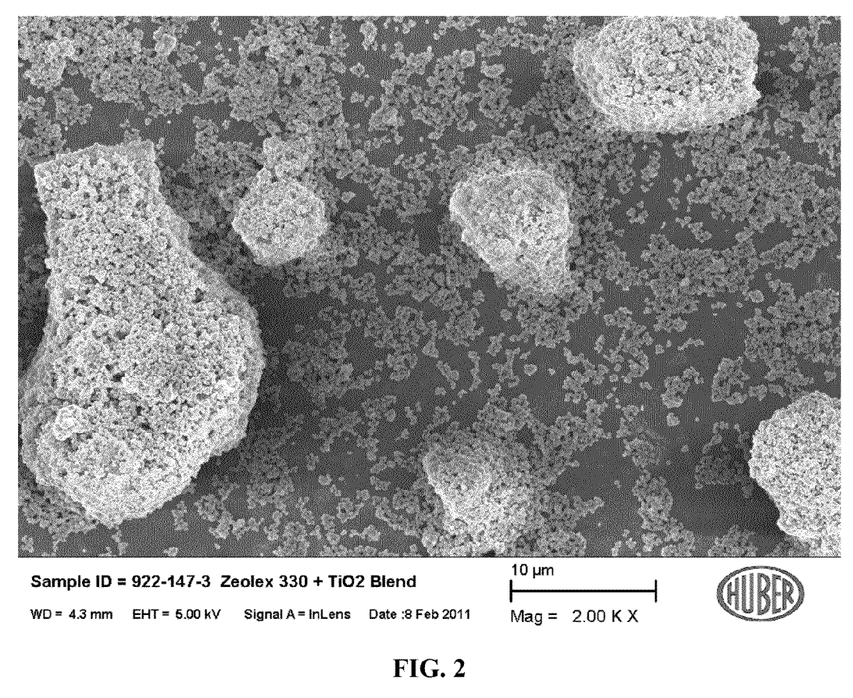
FIG. 2 is a scanning electron micrograph of a blend of Zeolex® 330 sodium aluminosilicate and titanium dioxide, in accordance with various aspects of the present disclosure.
Figure 3:
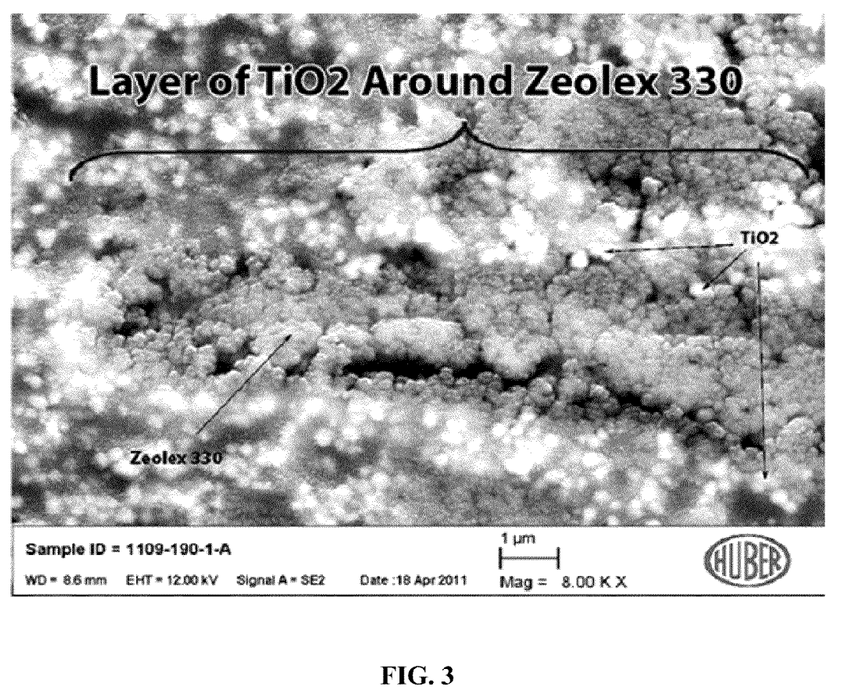
FIG. 3 is a scanning electron micrograph of a cross-section of a dried paint film, illustrating the presence of nested titanium dioxide particles in the surface of sodium aluminosilicate particles, in accordance with various aspects of the present disclosure.

With respect to the figures, FIGS. 1 and 2 are scanning electron micrographs that illustrate the inventive composite comprising a sodium aluminosilicate material and titanium dioxide particles disposed on the surface thereof. Similarly, FIG. 3 is a scanning electron micrograph of a cross-sectioned dried paint film, illustrating the presence of the inventive composite (i.e., nested titanium dioxide particles in the surface of sodium aluminosilicate particles), even after moxing into a coating formulation, application to a surface, and drying.

Figure 4:
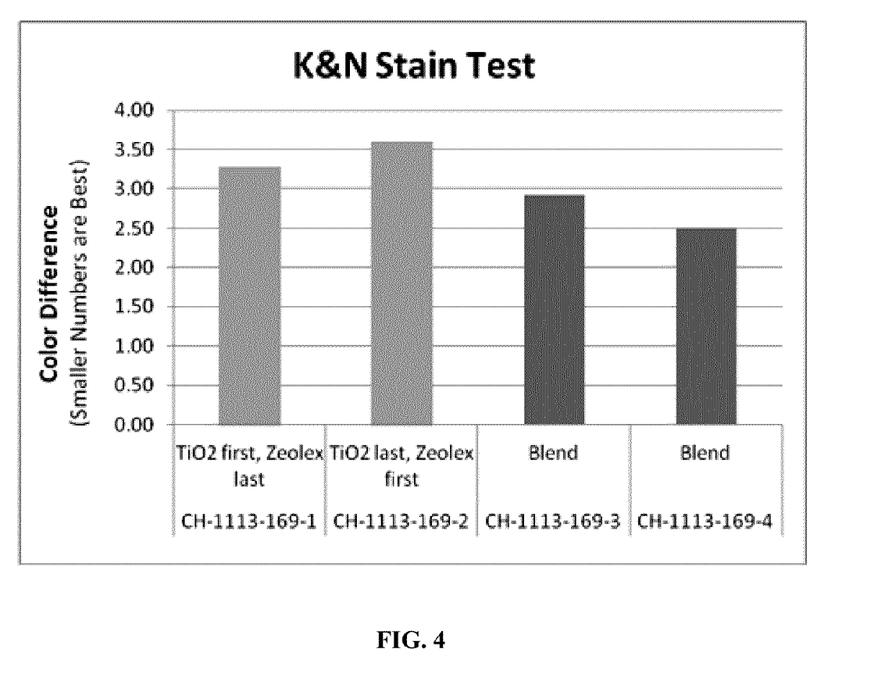
FIG. 4 is a graph illustrating stain resistance of conventional paint formulations containing titanium dioxide and sodium aluminosilicate and coatings comprising the inventive composite, in accordance with various aspects of the present disclosure.
Figure 5:
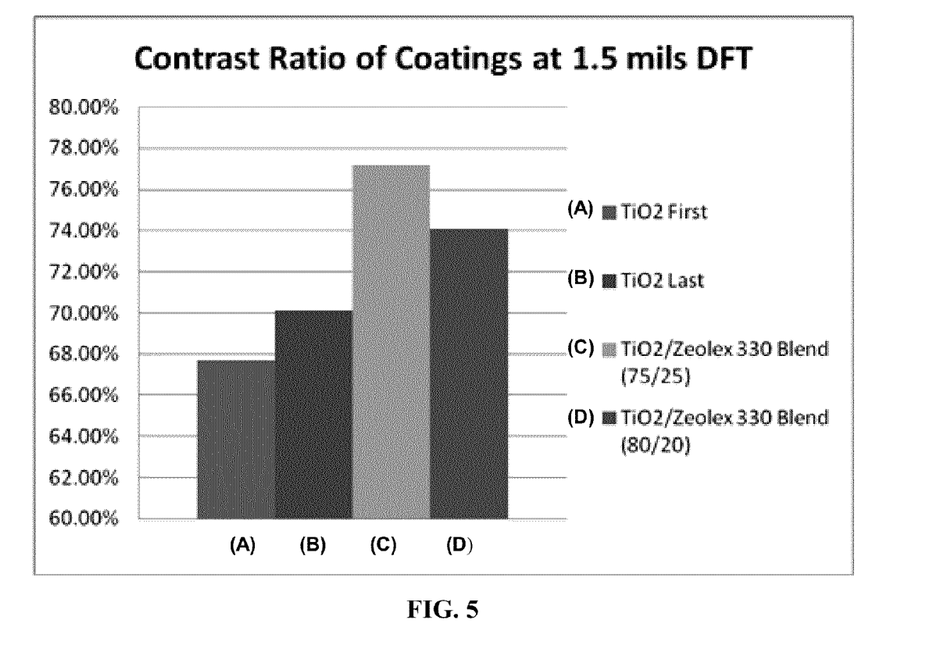
FIG. 5 is graph illustrating the contrast ratio of coatings at 1.5 mils dry film thickness (DFT) for conventional paint formulations and using the inventive composite.
Figure 6:
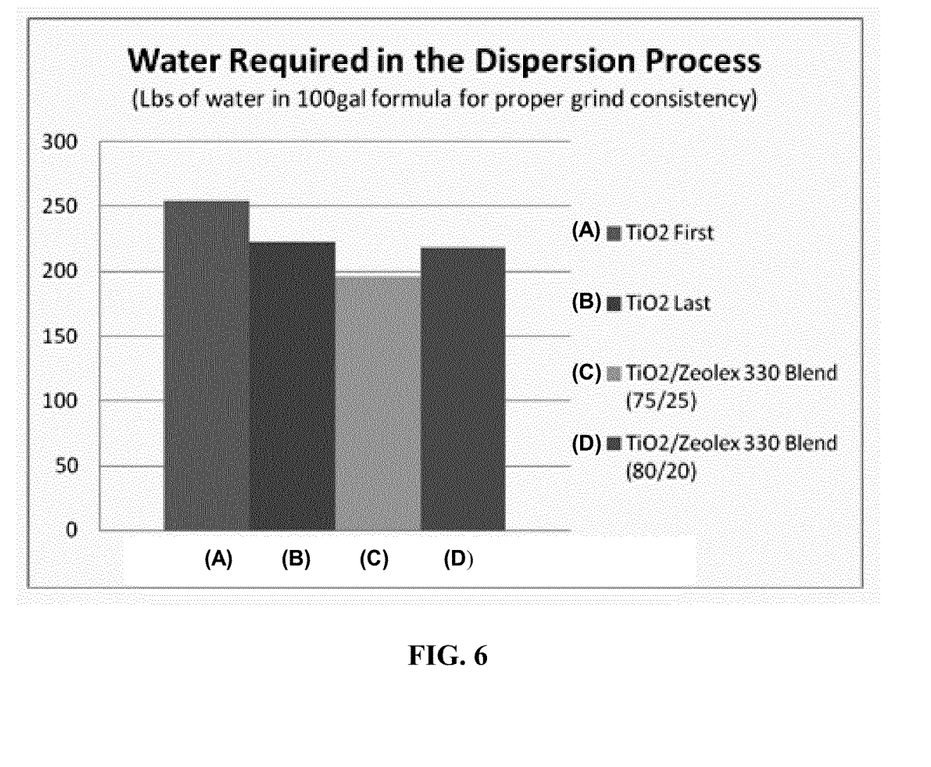
FIG. 6 is a graph illustrating the amount of water required to disperse titanium dioxide and sodium aluminosilicate in conventional paint formulations and using the inventive composite.

FIG. 4 is a graph illustrating the improved stain resistance of coatings prepared using the inventive composite, as compared to conventional paint formulations wherein titanium dioxide and sodium aluminosilicate are added separately. FIG. 5 is graph illustrating the improved contrast ratio of coatings (at 1.5 mils dry film thickness) prepared using the inventive composite, as compared to conventional paint formulations wherein titanium dioxide and sodium aluminosilicate are added separately. FIG. 6 is a graph illustrating the reduced amount of water required to disperse the inventive composite in a paint and/or coating system, as compared to conventional formulations wherein titanium dioxide and sodium aluminosilicate are added separately.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composite comprising a silicate material and a plurality of titanium dioxide particles disposed on the surface of the silicate material, wherein:
   the silicate material has an average particle size of from about 2 micrometers to about 50 micrometers,
   the weight percent ratio of the titanium dioxide particles to the silicate material is from about 3:1 to about 10:1, and
   the titanium dioxide particles have an average particle size of about 0.15 micrometer to less than about 1 micrometer.

2. The composite of claim 1, wherein the silicate material comprises an aluminosilicate.

3. The composite of claim 1, wherein the silicate material comprises a sodium aluminosilicate.

4. The composite of claim 1, wherein the titanium dioxide comprises a chloride-process rutile titanium dioxide.

5. A slurry comprising a liquid and the composite of claim 1.

6. A paint or coating formulation comprising a liquid and the composite of claim 1.

7. The paint or coating formulation of claim 6, wherein all or substantially all titanium dioxide is present on the surface of the silicate material.

8. The paint or coating formulation of claim 6, having at least one of improved opacity, improved contrast, and/or reduced water demand, as compared to conventionally prepared paint or coating formulations.

9. A method for preparing a composite, the method comprising contacting a silicate material and titanium dioxide particles, and then blending the silicate and titanium dioxide particles so as to form a composite, and wherein:
   the silicate material has an average particle size of from about 2 micrometers to about 50 micrometers,
   the weight percent ratio of the titanium dioxide particles to the silicate material is from about 3:1 to about 10:1, and
   the titanium dioxide particles have an average particle size of about 0.15 micrometer to less than about 1 micrometer.

10. A composite comprising a silicate material and a plurality of titanium dioxide particles disposed on the surface of the silicate material, wherein:
    the silicate material has an average particle size of from about 3 micrometers to about 40 micrometers,
    the weight percent ratio of the titanium dioxide particles to the silicate material is from about 2:1 to about 10:1, and
    the titanium dioxide particles have an average particle size of about 0.15 micrometer to less than about 1 micrometer.

11. The composite of claim 10, wherein the silicate material comprises an aluminosilicate.

12. The composite of claim 10, wherein the silicate material comprises a sodium aluminosilicate.

13. The composite of claim 10, wherein the silicate material has an average particle size of from about 3 micrometers to about 12 micrometers.

14. A slurry comprising a liquid and the composite of claim 10.

15. A paint or coating formulation comprising a liquid and the composite of claim 10.

16. The paint or coating formulation of claim 15, wherein all or substantially all titanium dioxide is present on the surface of the silicate material.

17. The paint or coating formulation of claim 15, having at least one of improved opacity, improved contrast, and/or reduced water demand, as compared to conventionally prepared paint or coating formulations.

* * * * *